Feb. 26, 1946.  O. E. STAPLES  2,395,591
MOTOR CONTROL
Original Filed Feb. 28, 1941   4 Sheets-Sheet 1

INVENTOR.
OTIS E. STAPLES
BY
Lewis Hudson Boughton & Williams
ATTORNEYS

Feb. 26, 1946.    O. E. STAPLES    2,395,591
MOTOR CONTROL
Original Filed Feb. 28, 1941    4 Sheets-Sheet 2

INVENTOR.
OTIS E. STAPLES
BY Kwis Hudson Boughton & Williams
ATTORNEYS

INVENTOR.
OTIS E. STAPLES
BY Kwis Hudson Boughton & Williams
ATTORNEYS

Patented Feb. 26, 1946

2,395,591

UNITED STATES PATENT OFFICE 2,395,591

MOTOR CONTROL

Otis E. Staples, Euclid, Ohio, assignor to The Cleveland Hobbing Machine Company, Cleveland, Ohio, a corporation of Ohio Original application February 28, 1941, Serial No. 381,035. Divided and this application October 2, 1943, Serial No. 504,693

5 Claims. (Cl. 172—239)

The present invention relates to machine tools and the like, and more particularly to a novel variable speed drive for machine tools and the like. This application is a division of my co-pending application Serial No. 381,035, filed February 28, 1941, now Patent No. 2,362,318, granted November 7, 1944.

The principal object of the present invention is the provision of a novel and improved drive for machine tools and the like comprising a multiple speed electric motor, that is, a motor having a limited number of definite speeds as distinguished from a variable speed electric motor having an infinite number of speeds in combination with means for automatically changing the speed of the motor, and a control device which, when actuated, causes the motor to operate at the same predetermined speed irrespective of the speed at which it was operating when said device was actuated.

Another object of the present invention is the provision of a novel and improved drive for machine tools and the like comprising a multiple speed electric motor, that is, a motor having a limited number of definite speeds as distinguished from a variable speed electric motor having an infinite number of speeds, means for automatically changing the speed of the motor, and a control device which, when actuated, causes the motor to operate at the same predetermined speed irrespective of the speed at which it was operating when said device was actuated and including manual means for causing the motor to operate, when started, either in accordance with its predetermined automatic cycle or at a selected one of its speeds.

The present invention resides in certain constructions and combinations and arrangements of parts, and further objects and advantages of the invention will be apparent to those skilled in the art to which the invention relates from the following description of the preferred embodiment thereof described with reference to the accompanying drawings forming a part of the specification and in which.

Figure 1:
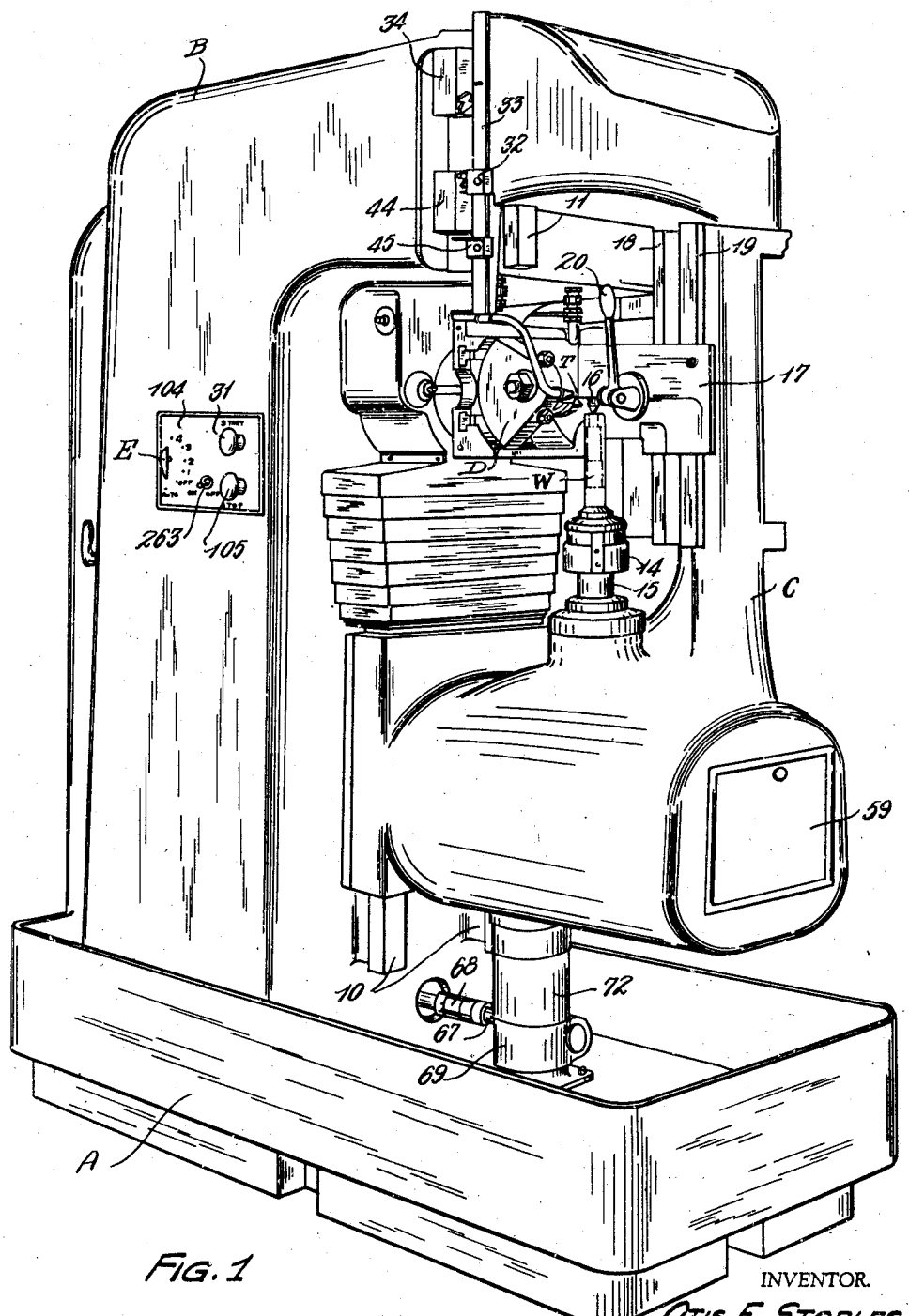
Fig. 1 is a perspective view of a machine embodying the present invention showing the front and left-hand side of the same as viewed from the front.

While the invention is susceptible of embodiment in various modifications and alternative constructions, it is herein shown and described as embodied in a vertical turning machine wherein the work is rotated about a vertical axis in cutting relation with a disk-like, face-type tool rotated about an axis at right angles to the axis of rotation of the work, while a relative feed movement is effected between the blank and cutter in a direction longitudinally of the axis of rotation of the work. The cutter has portions of different radii adapted to turn different diameters on the work blank, and the speed of rotation of the work blank is varied as the respective portions of the cutter engage the blank so that the cutting operation is always performed at the maximum cutting speed consistent with other requirements, thereby obtaining maximum production.

Referring to the drawings, the machine shown therein is of the vertical type and comprises a base A which forms a support for a vertical hollow column B which in turn supports a number of machine tool elements including a work head C slidably supported for vertical movement on two pairs of vertically spaced ways 10 and 11 on the column B, and a tool head D adjustably supported for movement in a horizontal plane in a cylindrical aperture 12 intermediate the ways 10 and 11. The work blank W is supported by a suitable chuck 14 fixed to the upper end of a vertical work spindle or machine tool element 15 and a center 16 carried by a suitable tailstock 17 slidably supported on vertical ways 18 and 19 formed on the side of a work head C. The tailstock 17 is adapted to be moved vertically and clamped and unclamped with respect to the ways 18 and 19 by a single operating lever 20.

Figure 3:
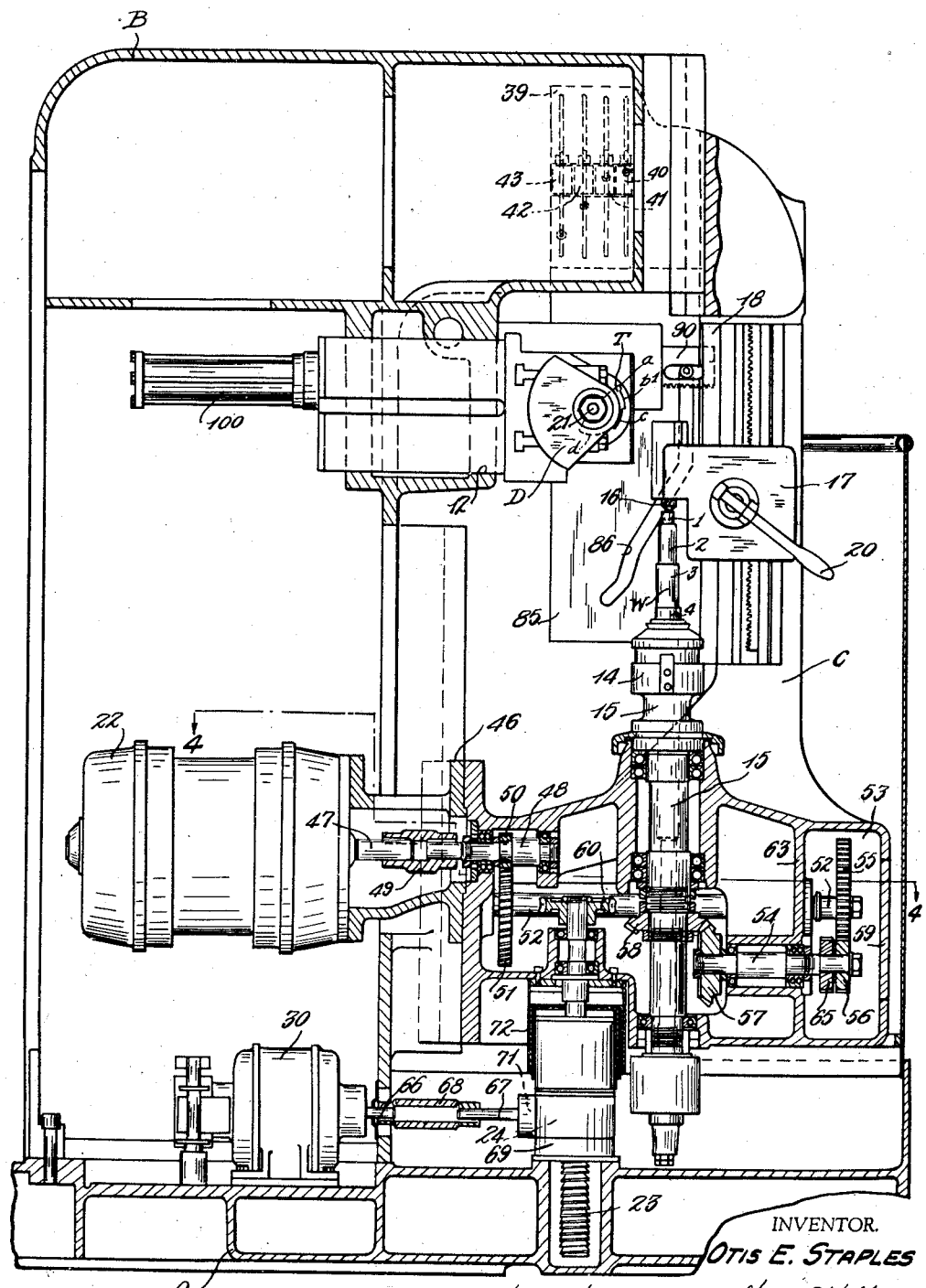
Fig. 3 is a vertical sectional view with portions in elevation taken approximately through the center line of the machine.
Figure 4:
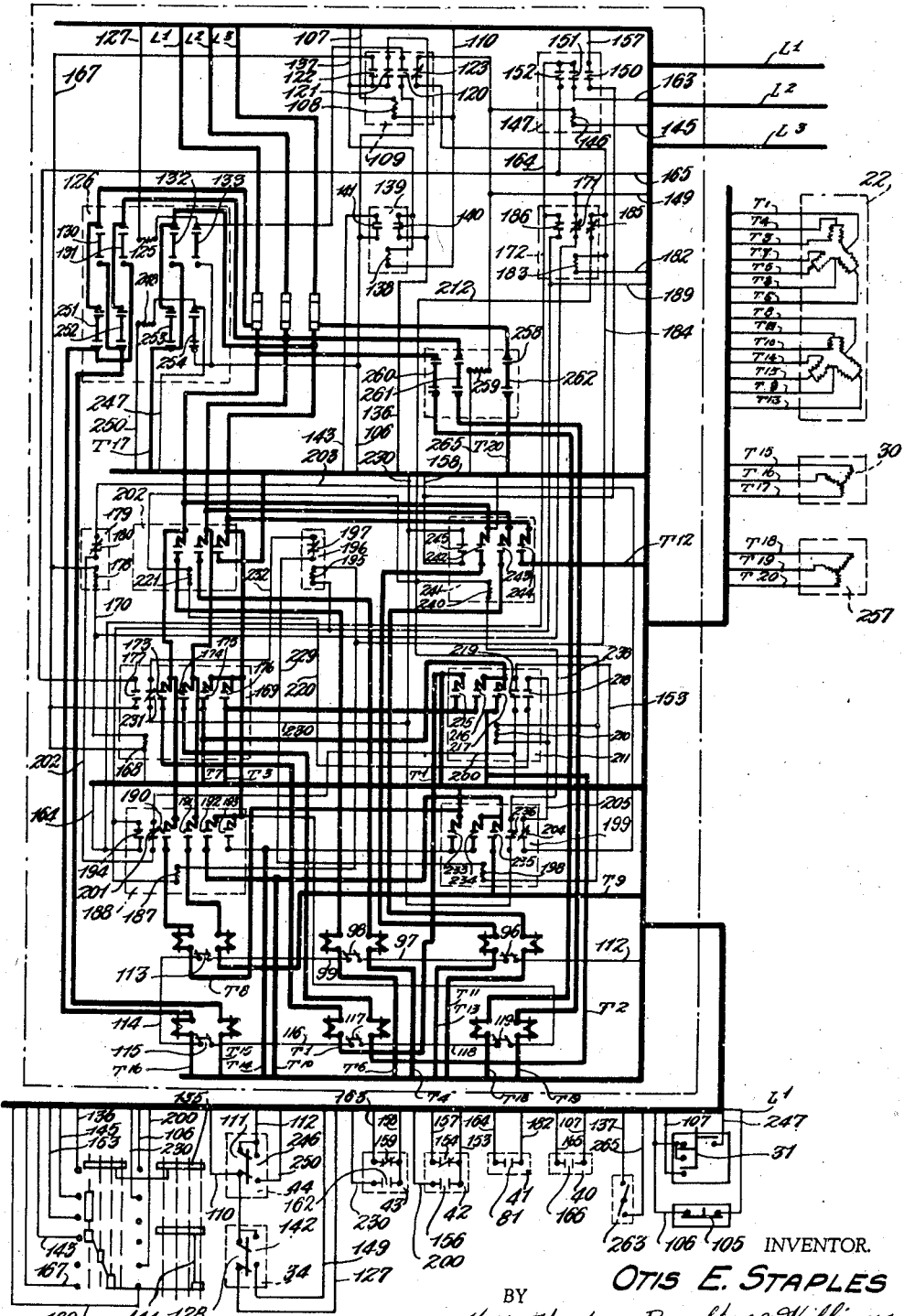
Fig. 4 is a wiring diagram of the electric circuits of the machine.

The tool T which is semi disk-like in shape is carried by a horizontal tool spindle or machine tool element 21 rotatably supported in a tool head D and during the cutting operation is slowly rotated about its axis as the work is fed vertically past the same. In the present instance the tool T is adapted to turn a piece of work having four different diameters, 1, 2, 3 and 4, and accordingly the tool has four arcuate cutting portions a, b, c, and d, each of different radius. In order to obtain maximum production from the machine, the work spindle 15 is driven by a multiple speed electric motor 22, see Fig. 3, hereinafter referred to as the cut motor, the speeds of which are so adjusted that maximum cutting speed in feet per minute consistent with other conditions, such as, the character of material being turned, the kind of tool employed, the rate of feed, etc., is maintained irrespective of which portion of the work blank is being turned. As shown, the vertical feed movement of the work head C which effects the feed is produced by a cooperating lead screw 23 and nut 24, the former of which is driven from the work spindle. A high speed reversible electric motor 30, hereinafter referred to as the rapid-traverse motor, operatively connected to the nut 24 provides means for rapidly moving the work head C to bring the work up to the tool at the beginning of the cycle of operations of the machine and for returning the work head to its starting position after the blank has been turned and removed.

The machine is started by pressing a start button 31, as will be hereinafter fully described, which closes a circuit to the rapid-traverse motor 30 causing the same to rotate the nut 24 to move the work head upwardly at a rapid rate. Just prior to the engagement of the work with the tool, an adjustable stop 32 carried on a bar 33 fixed to the top of the work head C actuates a switch 34, stopping the rapid-traverse motor 30 and starting the cut motor 22. Thereafter the work head C continues to move in an upward direction but at a feed rate, and as the different diameters of the work reach cutting position, the speed of the motor 22, which motor has a limited number of definite speeds as distinguished from a variable speed electric motor having an infinite number of speeds, is automatically changed by a plurality of adjustable stops 35, 36, 37, and 38 carried by a plate 39 fixed to the work head C. These stops actuate suitable electric speed selection switches 40, 41, 42 and 43 fixed to the upper part of the column B and connected in the control circuit in a manner hereinafter described.

After the cutting operation is completed the circuit to the cut motor 22 is opened upon the actuation of a travel limit switch 44 by an adjustable stop 45 on the bar 33, whereupon the machine stops. When the start button 31 is again depressed after the blank is removed, the rapid-traverse motor 30 operates in the reverse direction to return the work head C to starting position. In order to increase the flexibility of the machine the control for the cut motor 22 preferably comprises a drum controller, designated generally by the reference character E, through the medium of which control circuits for the motor can be so selected that the motor will go through its cycle of various speeds automatically or any one of its various speeds can be selected. In the latter event the selected speed alone will operate during the entire cutting operation. In addition to the automatic position, designated "auto," and the four different speed positions, designated "1," "2," "3," and "4," the drum controller E also has an off position, designated "off."

The work spindle 15 is rotatably supported by anti-friction bearings in the work head C and is driven from the cut motor 22 which is located within the column B but is fixed to and carried by the work head C through the medium of a bracket 46. The armature shaft 47 of the motor 22 is connected to a short shaft 48 by a coupling 49 of conventional construction. The shaft 48 is rotatably supported in the work head C and has a small gear 50 fixed thereon which is continuously in mesh with a large gear 51 fixed to a shaft 52 also rotatably supported in the work head C and which projects into a gear compartment 53 in the lower front part of the work head C. The shaft 52 is operatively connected to a short shaft 54 through the medium of gears 55 and 56 located within the gear compartment and fixed to the shafts 52 and 54, respectively. The shaft 54 is rotatably supported in the work head C and is provided at the left-hand end, as viewed in Fig. 3, with a bevel gear 57 continuously in mesh with the bevel gear 58 fixed to the work spindle 15. The gear compartment 53 is adapted to be closed by a removable cover 59, and the gears therein are preferably operated in oil.

The lead screw 23 is rotatably supported in the work head C against axial movement relative thereto and is rotated at a relatively slow speed and in timed relation to the rotation of the work spindle 15 to effect the feed movement of the work head C by the cut motor 22 to which it is operatively connected by a worm wheel 60 fixed to its upper end, which worm wheel is continuously in mesh with a worm (not shown) keyed on a horizontal shaft (not shown) rotatably supported in the work head C. This shaft, like the shaft 52, projects through the partition 63 in the work head C and the left-hand end thereof, is provided with a gear (not shown) in mesh with a gear 65 fixed to the shaft 54 to the left of the gear 56.

As previously stated, the nut 24 with which the lead screw 23 cooperates is adapted to be rotated at a high rate of speed to produce a rapid-traverse movement of the work head C in either direction by the rapid-traverse motor 30 which is supported on the bed A within the column B. The armature shaft 66 of the motor 30 is connected by a coupler 67 to a short shaft 68 rotatably supported in a bracket 69 which supports the nut 24. The shaft 68 is provided with a worm, not shown, continuously in mesh with a worm wheel 71 formed about the circumference of the nut 24. The lead screw 23 is preferably provided with a telescopic guard, designated generally as 72, which prevents the entrance of chips, etc., into the interior of the bracket 69.

Figure 2:
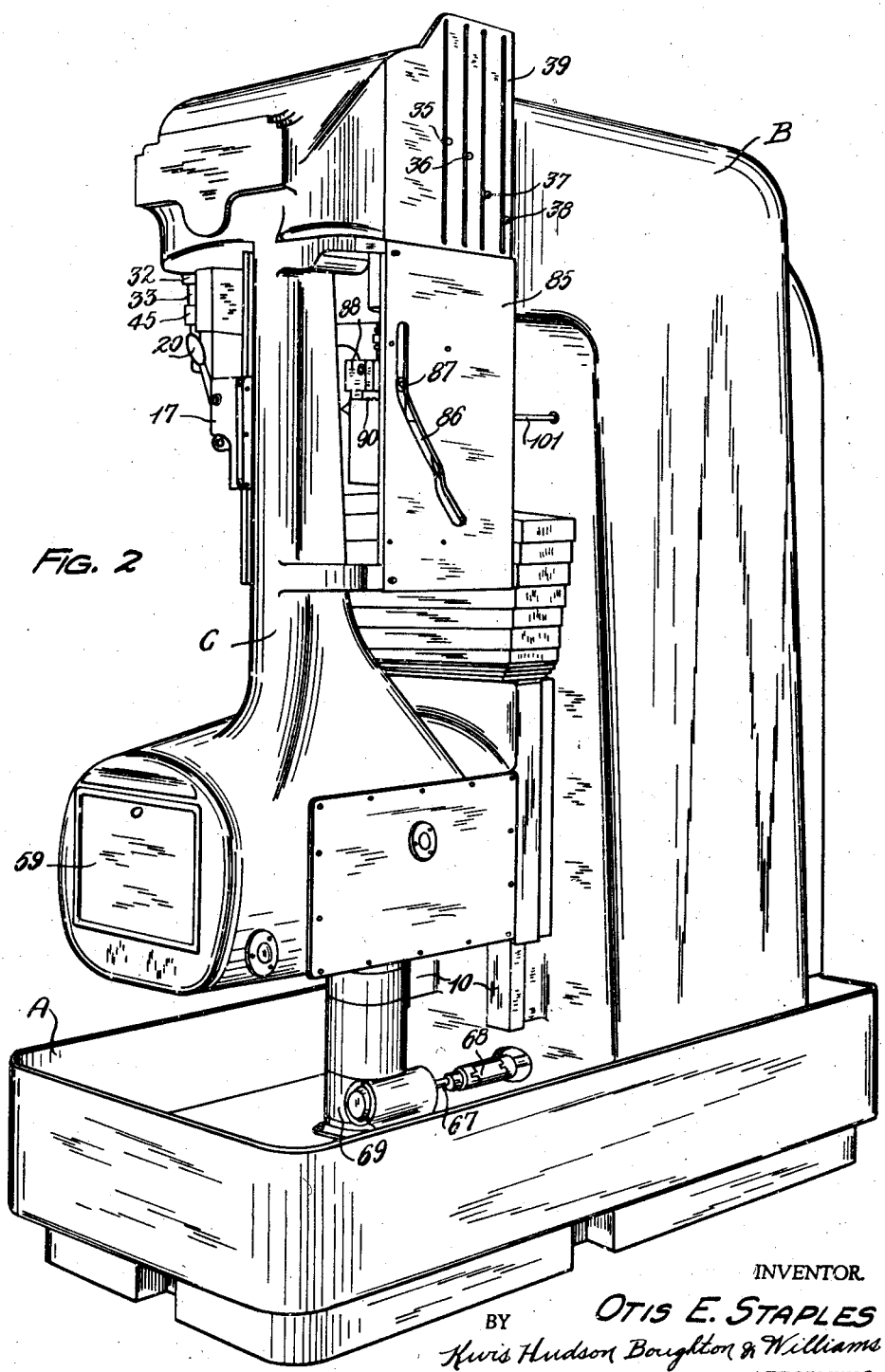
Fig. 2 is a perspective view of the machine shown in Fig. 1 showing the front and right-hand side of the machine.

As the work head C moves vertically the tool spindle 21, and, in turn, the tool or cutter T are rotated slowly at varying rates of speed depending upon the radius of the particular cutting edge of the tool in contact with the work blank at any time, etc. As shown, the rotation of the tool is effected by a cam plate 85 bolted or otherwise suitably detachably connected to the work head C, which cam plate has a cam slot 86 formed therein and within which a cam roller 87 engages. The cam roller 87 is adjustably fixed to a rack bar 88 slidably supported in an extension of the tool head D. The rack teeth 90 of the rack bar 88 are continuously in mesh with a gear fixed to the lower end of the tool spindle 21, as viewed in Fig. 7. In order to eliminate back-lash in the mechanism operatively connecting the tool spindle 21 to the cam plate 85, the tool spindle is continuously urged in a clockwise direction, as viewed in Fig. 2 by an air motor (not shown) located within the column B, the piston rod 101 of which motor is connected by a sprocket chain (not shown) to a sprocket wheel (not shown) fixed to the tool spindle 21. The air motor is continuously supplied with air under pressure during the operation of the machine.

The cut motor 22 shown is of the four-speed alternating current type which allows the spindle to be rotated at any of four different speeds, thus producing a machine which will accommodate the turning of pieces of work having four or less different diameters thereon with the cutting operation always being performed at maximum efficiency. It is to be understood, however, that a motor having any desired number of speeds can be employed. The type of motor selected will depend upon the particular article to be turned. A four-speed motor is selected in the present instance because four speeds are sufficient to accommodate most articles which the machine shown is designed to turn. In the event that it is desired to turn an article having more than four different diameters on the machine shown, two of the diameters which most nearly approach each other in size can be turned at the same speed or the shortest diameter can be turned at one of the four speeds which is most appropriate.

The relative positions of the various parts of the machine at the commencement of a cycle of operations is shown in Fig. 1. As shown in this figure the work head is at the bottom of its travel and a work blank has been positioned in the work head. The machine is started by depressing the start push button switch 31 located on a control panel 104 fixed to the left-hand side of the machine in a position readily accessible to the operator. With the drum controller E set at "auto," the depressing of the start push button switch 31 closes a circuit from line L—1 through normally closed stop push button switch 105, line 106, normally open start push button switch 31, line 107, operating solenoid 108 of relay 109, line 110, contacts 111 of a travel limit switch 44, line 112, overload contacts 96, line 97, overload contacts 98, line 99, overload contacts 113, line 114, overload contacts 115, line 116, overload contacts 117, line 118, overload contacts 119, to L—3. The overload contacts 96, 95, 113, 115, 117 and 119 are located on motor control panels, hereinafter referred to. The particular motor control panel upon which these overload contacts are positioned is shown in the wiring drawing.

Energization of the operating solenoid 108 of relay 109 closes the normally open contacts 120, 121 and 122 thereof and opens the normally closed contacts 123 thereof. The closing of the contacts 120 of relay 109 establishes a circuit from the line L—1 through the normally closed stop push button switch 105, line 106, contacts 120, line 124, operating solenoid 125 of rapid-traverse motor control panel 126, line 127, closed contacts 128 of change-over switch 34, line 110, closed contacts 111 of travel limit switch 44, line 112, etc., to L—3. Energization of operating solenoid 125 of rapid-traverse motor control panel 126 closes the normally open contacts 130, 131 and 132, connecting the rapid-traverse motor 30 to the power lines L—1, L—2 and L—3 in such a manner that the motor is operated in a direction to rapidly raise the work head C.

Simultaneously with the closing of contacts 130, 131 and 132 of the rapid-traverse motor control panel 126, normally open contacts 133 on the same panel are closed. These contacts are in parallel circuit with the contacts 120 of relay 109 and establish a holding circuit for the operating solenoid 125 continuing the operation of the rapid-traverse motor 30 after the start push button switch 31 is released. The closing of the contacts 121 of relay 109 establishes a circuit from the line L—1 through the stop push button switch 105, line 106, contact bar 135 of drum controller E, line 136, contacts 121, line 137, operating solenoid 138 of relay 139, line 110, closed contacts 111 of travel limit switch 44, line 112, etc., to L—3. Energization of the operating solenoid 138 of relay 139 closes the normally open contacts 140 and 141 thereof. The contacts 140 are in parallel circuit with the contacts 121 of relay 109 and the closing of these contacts establishes a holding circuit for the operating solenoid 138 of relay 139 maintaining the solenoid energized after the start push button switch 31 is released. The closing of contacts 122 of relay 109 and the closing of contacts 141 of relay 139 do not establish circuits since these contacts are in series with open contacts 142 of change-over switch 34.

Just prior to the engagement of the work with the tool, the stop 32 actuates the change-over switch 34 to open the closed contacts 128 thereof and close the open contacts 142. The opening of contacts 128 of change-over switch 34 deenergizes the operating solenoid 125 of rapid-traverse motor control panel 126 disconnecting the rapid-traverse motor from the line and allowing the same to stop. The closing of contacts 142 establishes a circuit from the line L—1 through the stop push button switch 105, line 106, normally open contacts 141 of relay 139, which are now closed, line 143, contact bar 144 of drum controller E, line 145, operating solenoid 146 of relay 147, line 149, closed contacts 142 of change-over switch 34, line 110, closed contacts 111 of travel limit switch 44, line 112, etc., to L—3.

Energization of the operating solenoid 146 of the relay 147 closes the normally open contacts 150, 151 and 152 thereof. This establishes a circuit from the line L—1 through the stop push button switch 105, wire 106, closed contacts 141, line 143, contact bar 144, line 153, normally closed contacts 154 of speed selection switch 42 which also includes normally open contacts 156, line 157, contacts 150, line 158, normally closed contacts 159 of speed selection switch 43 also having normally open contacts 162, line 163, contacts 151, line 164, contacts 152, line 165, normally open contacts 166 of speed selection switch 40, which contacts by prearrangement are now closed by the stop 35 on the plate 39, line 167, operating solenoid 168 of relay 109, line 110, closed contacts 111 of travel limit switch 44, line 112, etc., to L—3. This circuit again closes the normally open contacts of relay 109, contacts 122 of which establish a circuit from the line 137, closed contacts 122 of relay 109, line 167, operating solenoid 168 of motor control panel 169, line 170, normally closed contacts 171 of relay 172, line 149, closed contacts 142 of change-over switch 34, line 110, closed contacts 111 of travel limit switch 44, line 112, etc., to L—3.

Energization of the operating solenoid 168 of motor control panel 169 closes the normally open contacts 173, 174, 175 and 176 thereof, connecting the motor 22 to the power lines L—1, L—2 and L—3 in such a manner that the motor rotates at one of its four speeds, which speed is hereinafter referred to as the "first" speed. Simultaneously with the closing of contacts 173, 174, 175 and 176 of motor control panel 169, normally open contacts 177 are also closed. These contacts establish a holding circuit for the operating solenoid 169 of the motor control panel 169 after the speed selection switch 40 is opened upon movement of the stop 35 away from the operating arm thereof. This holding circuit is from the line L—1 through stop push button switch 105, line 106, closed contacts 141 of relay 139, line 143, contact bar 144 of drum controller E, line 153, normally closed contacts 154 of speed selection switch 42, line 157, closed contacts 150 of relay 147, line 158, normally closed contacts 159 of speed selection switch 43, line 163, contacts 151, line 164, contacts 152, line 165, contacts 177, line 167, operating solenoid 168, line 170, normally closed contacts 171, line 149, closed contacts 142, line 110, closed contacts 111, line 112, etc., to L—3.

The operating solenoid 178 of relay 179 is in parallel circuit with the operating solenoid 168 of motor control panel 169 and the relay is actuated simultaneously with the contacts of the motor control panel 169 to open the normally closed contacts 180 thereof. The contacts 180 of relay 179 are in series circuit with the operating solenoids of the motor control panels, hereinafter referred to, which cause the motor 22 to operate at its "third" speed and the opening of these contacts makes certain that these operating solenoids will not be simultaneously energized with the operating solenoid 168 of motor control panel 169 which causes the motor to operate at its "first" speed.

The machine continues to operate with the cut motor rotating at its "first" speed until the stop 36 closes the contacts 181 of the speed selection switch 41, whereupon a circuit is established from the line L—1 through the stop push button switch 105, line 106, closed contacts 141 of relay 139, line 143, contact bar 144 of drum controller E, line 153, normally closed contacts 154 of speed selection switch 42, line 157, closed contacts 150 of relay 147, line 158, normally closed contacts 159 of speed selection switch 43, line 163, closed contacts 151 of relay 147, line 164, normally open contacts 181 of speed selection switch 41, line 182, operating solenoid 183 of relay 172, line 184, normally closed contacts 123 of relay 109 which is now de-energized, line 149, closed contacts 142 of change-over switch 34, line 110, closed contacts 111 of travel limit switch 44, line 112, etc., to L—3. Energization of the operating solenoid 183 of relay 172 opens the normally closed contacts 171 and 185 and closes the normally open contacts 186 thereof. The opening of the normally closed contacts 171 of relay 172 opens the circuit through the operating solenoid 168 of motor control panel 169, disconnecting the connections to the motor 22 by virtue of which it operates at its "first" speed. This also deenergizes the operating solenoid 178 of relay 179 allowing the contacts 180 thereof to close.

The closing of the contacts 186 of relay 172 establishes a circuit through the operating solenoid 187 of motor control panel 188 from the line L—1, through stop push button switch 105, line 106, closed contacts 141 of relay 139, line 143, contact bar 144 of drum controller E, line 153, normally closed contacts 154 of speed selection switch 42, line 157, closed contacts 150 of relay 147, line 158, normally closed contacts 159 of speed selection switch 43, line 163, closed contacts 151 of relay 147, line 164, contacts 186, line 189, operating solenoid 187, line 184, normally closed contacts 123 of relay 109, line 149, closed contacts 142 of change-over switch 34, line 110, closed contacts 111 of travel limit switch 44, line 112, etc., to L—3. Energization of the operating solenoid 187 of the motor control panel 188 closes the normally open contacts 190, 191, 192 and 193 to the power lines in such a manner that the motor continues to operate but at a different speed, herein referred to as the "second" speed. Simultaneously with the closing of the contacts 190, 191, 192 and 193 of motor control panel 188, contacts 194 of the same motor control panel are closed. These contacts are in parallel circuit with the contacts 186 of relay 172 and establish a holding circuit therearound which maintains the operating solenoid 187 of motor control panel 188 energized after the contacts 181 of speed selection switch 41 have opened by the stop 36 moving clear of the actuating arm of said switch. Operating solenoid 195 of relay 196 is in parallel circuit with the operating solenoid 187 of motor control panel 188 and is energized simultaneously therewith to open the normally closed contacts 197 of said relay, which contacts are in series circuit with the operating solenoid 198 of motor control panel 199 by virtue of which the motor is connected to the lines L—1, L—2, and L—3 in such a manner that it operates at a different speed, hereinafter referred to as its "fourth" speed, thus eliminating any possibility of the operating solenoid 198 being simultaneously energized with the operating solenoid 187.

The machine continues to operate with the motor 22 rotating at its "second" speed until the speed selection switch 42 is actuated by engagement of the stop 37 with the operating arm thereof. Actuation of this switch by the stop 37 opens the normally closed contacts 154 and closes the normally open contacts 156 thereof. The opening of the normally closed contacts 154 of speed selection switch 42 breaks the circuit to the operating solenoid 187 of motor control panel 188, deenergizing the circuits by virtue of which the motor operates at its "second" speed. The operating solenoid 195 of relay 196 which is in parallel circuit with the operating solenoid 187 of motor control panel 188 is deenergized at the same time, allowing the normally closed contacts 197 of said relay to close. The closing of contacts 156 of speed selection switch 42 establishes a circuit from the line L—1, through the stop push button switch 105, line 106, contacts 141 of relay 139, line 143, contact bar 144 of drum controller E, line 153, contacts 156 of speed selection switch 42, line 200, normally closed contacts 201 of motor control panel 188, line 202, normally closed contacts 180 of relay 179, line 203 normally closed contacts 204 of motor control panel 199, line 205, operating solenoid 210 of motor control panel 211, line 212, normally closed contacts 185 of relay 172, line 184, normally closed contacts 123 of relay 109, line 149, closed contacts 142 of change-over switch 34, line 110, closed contacts 111 of travel limit switch 44, line 112, etc., to L—3. The contacts 201 of motor control panel 188, which are now closed, were opened while the motor was operating at its "second" speed, thus preventing any possibility of the operating solenoid 210 of motor control panel 211 being energized simultaneously with the energization of the operating solenoid 187 of the motor control panel 188 by virtue of which the motor is caused to operate at its "second" speed. In like manner the contacts 204, which are now closed, will be open when the motor is operating at its "fourth" speed, thus preventing simultaneous energization of the operating solenoid 210 of motor control panel 211 with the operating solenoid 198 of motor control panel 199.

Energization of the operating solenoid 210 of motor control panel 211 closes the normally open contacts 215, 216, 217, 218 and 219 thereof. The closing of the normally open contacts 218 establishes a circuit from the line 205 through the contacts 218, line 220, operating solenoid 221 of motor control panel 222 to line 212. As previously stated, energization of the operating solenoid 210 of motor control panel 211 closes the normally open contacts 215, 216, and 217 thereof and the energization of the operating solenoid 221 of the motor control panel 222 closes the normally open contacts 223, 224 and 225 thereof. The closing of the contacts 215, 216, 217, 223, 224 and 225 connects the motor 22 to the source of power in such a manner that the motor operates at a different speed than heretofore, which speed is herein referred to as the "third" speed. The closing of normally open contacts 219 of motor control panel 211 establishes a holding circuit around the contacts 156 of speed selection switch 42. This maintains the operating solenoids 210 and 221 of the motor control panel 211 and 222, respectively, energized after the contacts 156 have opened upon movement of the stop 37 away from the actuating mechanism of the speed selection switch 42.

The machine continues to operate with the motor rotating at its "third" speed until the speed selection switch 43 is actuated by engagement of the stop 38 with the operating arm thereon. Actuation of this switch by the stop 38 opens the normally closed contacts 159 and closes the normally open contacts 162 thereof. The closing of the normally open contacts 162 of speed selection switch 43 establishes a circuit from the line L—1 through the stop push button switch 105, line 106, contacts 141 of relay 139, line 143, contact bar 144 of drum controller E, line 153, contacts 154 of speed selection switch 42, line 157, contacts 150 of relay 147, line 158, contacts 162 of speed selection switch 43, line 230, normally closed contacts 231 of motor control panel 169, line 232, normally closed contacts 197 of relay 196, line 229, operating solenoid 198 of motor control panel 199, line 212, normally closed contacts 185 of relay 172, line 184, normally closed contacts 123 of relay 109, line 149, contacts 142 of change-over switch 34, line 110, contacts 111 of travel limit switch 44, line 112, etc., to L—3.

Energization of the operating solenoid 198 of motor control panel 199 closes the normally open contacts 233, 234, 235 and 236, and opens the normally closed contacts 204 thereof. The closing of the normally open contacts 236 establishes a circuit for the operating solenoid 240 of motor control panel 241 from the line 230, through line 238, line 212, etc., closing the normally open contacts 242, 243, 244 and 245. The closing of contacts 233, 234, and 235 of motor control panel 199 and contacts 242, 243, and 244 of motor control panel 241 connects the cut motor 22 to the lines L—1, L—2 and L—3 in such a manner that the motor operates at a different speed, herein referred to as the "fourth" speed. The closing of the normally open contacts 245 of motor control panel 241, which are in parallel circuit with the normally open contacts 162 of speed selection switch 43, maintains closed the circuit to the operating solenoids 198 and 240 of the motor control panels 199 and 241 after the contacts 162 open due to the stop 38 moving away therefrom. The contacts 159 of speed selection switch 43 are in series circuit with the operating solenoid 187 which when energized causes the motor 22 to operate at its "second" speed and the opening of these contacts prevents energization of the operating solenoid 187 simultaneous with the energization of the operating solenoids 198 and 240 of the motor control panels 199 and 241.

Any possibility of the operating solenoid 168 of the motor control panel 169 or the solenoids 210 and 221 of the motor control panels 211 and 222, respectively, being energized simultaneously with the energization of the operating solenoids 198 and 240 of motor control panels 199 and 241, respectively, is prevented in the manner previously pointed out.

The cut motor 22 continues to operate at its "fourth" speed until the travel limit switch 44 is actuated by the stop 45 to open the normally closed contacts 111 thereof and close the normally open contacts 246. The opening of the normally closed contacts 111 of the travel limit switch 44 breaks the circuit to the operating solenoids 198 and 240 of the motor control panels 199 and 241, respectively, whereupon the motor comes to rest. If at any time during the operation of the motor 22 at any of its speeds other than the "first" speed the start button 31 is depressed, the motor will drop back to its "first" speed by virtue of the closing of contacts 122 of relay 109 and the opening of contacts 123 of the same relay. The closing of contacts 122 completes the circuit to the necessary relays, etc., to connect the cut motor 22 to the lines L—1, L—2 and L—3 in such a manner that it operates at its "first" speed, and the simultaneous opening of the normally closed contacts 123 breaks the circuit to all other relays, etc., as will be apparent from the wiring diagram. The cut motor 22 then continues to operate at its "first" speed until one of the speed selection switches 41, 42 and 43 is actuated by its respective stop, whereupon the motor operates at the selected speed and continues its automatic cycle of operation. Any possibility of energizing the operating solenoids 198, 240, 210 and 221 of the motor control panels 199, 241, 211 and 222, respectively, simultaneously with the operating solenoid 187 of motor control panel 188 is prevented by the normally closed contacts 185 of relay 172, which contacts open along with the closing of contacts 186 which latter contacts energize the operating solenoid 187.

With the work head C at the upper limit of its travel, the work blank is removed and thereafter the work head is returned to its initial position by again depressing the start push button 31. When the start push button switch 31 is now depressed, a circuit is established from the line L—1 through the stop push button switch 105, line 106, start push button switch 31, line 247, operating solenoid 248 of motor control panel 126, line 250, contacts 249 of travel limit switch 44, line 112, etc., to L—3. Energization of the operating solenoid 248 of motor control panel 126 closes the normally open contacts 251, 252, 253 and 254 thereof. The closing of contacts 251, 252 and 253 connects the rapid-traverse motor 30 to the lines L—1, L—2 and L—3 in such a manner that it rotates in the opposite direction, that is, in a direction to lower the work head C. The closing of the normally open contacts 254 of the motor control panel 126 which are in parallel circuit with the start push button switch 31 maintains the circuit to the operating solenoid 248 after the start push button switch has been released. As the work head C moves down, the change-over switch 34 is reset by the stop 32 to again close the contacts 128 and open the contacts 142 thereof. The spindle head continues to move down at a rapid-traverse rate until the travel limit switch 44 is actuated by the stop 32 to open the closed contacts 246 and close the open contacts 111 thereof. The opening of the contacts 246 breaks the circuit to the operating solenoid 248 of motor control panel 126, stopping the rapid-traverse movement. The electrical circuits have now all been returned to their original positions and the cycle of operations can again be completed by depressing the start push button switch 31.

As previously stated, the drum controller E has positions to which it can be turned, designated "first," "second," "third" and fourth," corresponding with the respective speeds of the cut motor, and when turned to either of these positions the cut motor 22 will operate at the speed selected throughout the entire cutting operation. In all of the above-mentioned four positions, the line 106 is connected to the line 136 by the contact bar 255, thus establishing the same circuits as are established by the contact bar 135 when the drum controller E is set at "auto." When the drum controller E is in "first" position, the line 143 is connected to the line 167 through the contact bar 256. This establishes a circuit from the line L—1 through the stop push button switch 105, line 106, contacts 141 of relay 139, line 143, contact bar 256, line 167, operating solenoid 168 of motor control panel 169, line 170, contacts 171 of relay 172, line 149, contacts 142 of change-over switch 34, line 110, contacts 111 of travel limit switch 44, line 112, etc., to L—3, upon the closing of the contacts 142 of change-over switch 34 which takes place, as previously explained, just prior to the engagement of the work with the cutter. This circuit is maintained throughout the upward continued movement of the work head C as the selection switches for the other speeds are not connected in this circuit. The fact that various selection switches are subsequently actuated has no effect upon the circuit since the circuits for energizing the operating solenoids of other motor control panels are open as long as the operating solenoid of the motor control panel 169 is energized, as previously explained.

When the drum controller E is turned to "second" position, the contact bar 256 is connected to line 189 in place of line 167. This establishes the operating circuit for solenoid 187 of motor control panel 188 upon the closing of contacts 142 of change-over switch 34 in a manner similar to that previously described with reference to the energization of operating solenoid 168 of motor control panel 169. When the drum controller E is rotated to "third" position, the contact bar 256 is connected to line 230, and, when rotated to "fourth" position, the contact bar is connected to line 239 causing the operating solenoids of motor control panels 211 and 222, and 199 and 241, respectively, upon the closing of contacts 142 of change-over switch 34, causing the cut motor 22 to operate at its "third" or "fourth" speed, as the case may be, in a manner similar to that in which it was caused to actuate at its "first" and "second" speeds when the contact bar 256 is connected to the lines 167 and 189, respectively.

Coolant for the tool is adapted to be supplied by a pump, not shown on the drawings, which pump is driven by an electric motor 257, the operation of which is controlled by a motor control panel 258, the operating solenoid 259 of which is connected in the control circuit previously described in such a manner that the motor 257 operates only while the cut motor 22 is operated. When the operating solenoid 259 of the motor control panel 258 is energized, the normally open contacts 260, 261 and 262 thereof are closed connecting the motor to the lines L—1, L—2 and L—3 causing the same to operate. A snap switch 263 located on the control panel 104 provides means for preventing operation of the motor 257 when it is desired to operate the cut motor 22 without the coolant motor 257. When the switch 263 is closed, a circuit is established from the line 137 through the switch 263, line 265, operating solenoid 259 of motor control panel 258 to line 149. This circuit is in parallel with the operating solenoid 138 of relay 139 when the contacts 142 of change-over switch 34 are closed.

The cut motor 22 is a four-speed alternating current motor of conventional construction. The connections between the motor control panels which actuate the same and the motor are not referred to herein in detail but are well-known in the art and are shown on the wiring diagram. In the wiring diagram, the leads to the motor 22 are designated by the reference characters T—1 to T—14, inclusive. The leads to the motor 30 are designated by the reference characters T—15, T—16 and T—17 and the leads to the motor 257 by the reference characters T—18, T—19 and T—20. The machine can be stopped at any time by depressing the stop push button switch 105. In the embodiment of the invention shown, only two adjustable stops 32 and 45 are employed on the bar 33. In this event the stop 32 performs the dual function of determining the change-over position, that is the position where the rapid-traverse up movement of the work head C stops and the feed movement starts in the cycle of operations, and the down position of the work head C. In other words, the stop 33 actuates the change-over switch 34 and the travel limit switch 44, the latter when the work head C is moving in a downward direction. Alternately a separate adjustable stop may be used to actuate the change-over switch 34, in which event the sole function of the stop 32 shown would be that of limiting the downward movement of the work head C.

From the foregoing description of the preferred embodiment of the invention it will be apparent that the objects of the invention heretofore enumerated and others have been accomplished and that there has been provided a new and improved drive for machines of the character described etc. While the preferred embodiment of the invention has been described with considerable detail, it will be apparent that the invention is not limited to the particular construction shown, for example, a motor having any number of different speeds may be controlled. It will also be apparent that the motor can be operated at its various speeds in any desired sequence by suitably arranging the stops which actuate the speed selecting switches. Other alternative constructions will be apparent to those skilled in the art to which the invention relates and it is my intention to hereby cover all adaptations, modifications and uses thereof which comes within the practice of those skilled in the art to which the invention relates.

The phrase "multiple speed electric motor" as used throughout this specification and the following claims, defines an electric motor having a limited number of definite speeds as distinguished from a variable speed electric motor having an infinite number of speeds.

Having thus described my invention, I claim:

1. In a device of the character referred to, the combination of: a frame; a member movably supported by said frame; means comprising a multiple speed alternating current electric motor for moving said member; and means for causing said motor to automatically operate in sequence at a plurality of speeds whereby said member performs a cycle of operations, said means including control mechanism which when actuated at any time subsequent to the initiation of said cycle of operations and prior to the completion thereof causes said motor to operate at a predetermined speed which speed is always the same regardless of the place in the cycle of operations at which said control mechanism is actuated and continue at said speed until the next speed change in the cycle of operations is reached after which the normal cycle of operations is continued.

2. In a device of the character referred to, the combination of: a frame; a member movably supported by said frame; means comprising a multiple speed alternating current electric motor for moving said member; and means for causing said motor to automatically operate in sequence at a plurality of speeds whereby said member performs a cycle of operations, said means including a manually operable control device which when actuated prior to the initiation of said cycle of operations initiates the same and which when actuated at any time subsequent to the initiation of said cycle of operations and prior to the completion thereof causes said motor to operate at a predetermined speed which speed is always the same regardless of the place in the cycle of operations at which said control device is actuated and continue at said speed until the next speed change in the cycle of operations is reached at which time the normal cycle of operations is resumed.

3. In a device of the character referred to, the combination of: a frame; a member movably supported by said frame; means comprising a multiple speed alternating current electric motor for moving said member; and means actuated in timed relation to the movement of said member for causing said motor to automatically operate in sequence at a plurality of speeds corresponding with predetermined movements of said member whereby a cycle of operations is performed, said means including a control device which when actuated prior to the initiation of said cycle of operations initiates the same and which when actuated at any time subsequent to the initiation of said cycle of operations and prior to the completion thereof causes said motor to operate at a predetermined speed which speed is always the same regardless of the place in the cycle of operations at which said control device is actuated and continue at said speed until the next speed change in the cycle of operations is reached after which the normal cycle of operations is completed.

4. In a device of the character referred to, the combination: a frame; a member movably supported by said frame; means comprising a multiple speed alternating current electric motor for moving said member; and means including selector mechanism for causing said motor to operate at a selected one of a plurality of its speeds or to automatically operate in sequence at a plurality of speeds whereby said member performs a cycle of operations, said means including control mechanism which when actuated at any time subsequent to the initiation of said cycle of operations and prior to the completion thereof causes said motor to operate at a predetermined speed which speed is always the same regardless of the place in the cycle of operations at which said control mechanism is actuated and continue at said speed until the next speed change in the cycle of operations is reached at which time the normal cycle of operations is resumed.

5. In a device of the character referred to, the combination of: a frame; a member movably supported by said frame; means comprising a multiple speed alternating current electric motor for moving said member; and means including selector mechanism for causing said motor to operate at a selected one of a plurality of its speeds or to automatically operate in sequence at a plurality of speeds whereby said member performs a cycle of operations, said means including a manually operable control device which when actuated with said motor at rest initiates actuation thereof and which when actuated subsequent to the initiation of said cycle of operations and prior to the completion thereof always causes said motor to operate at a predetermined speed which speed is always the same regardless of the place in the cycle of operations at which said control device is actuated and continue at said speed until the next speed change in the cycle of operations is reached after which the normal cycle of operations is continued.

OTIS E. STAPLES.